US006611266B1

(12) United States Patent
Pollack et al.

(10) Patent No.: US 6,611,266 B1
(45) Date of Patent: Aug. 26, 2003

(54) METHOD FOR ACHIEVING ROAMING CAPABILITIES AND PERFORMING INTERACTIVE CGI IMPLANTING, AND COMPUTER GAMES USING SAME

(76) Inventors: Yoram Pollack, 33 Sharet Street, Tel Aviv (IL); Daniel Shor, 8 Patai Street, Tel Aviv (IL); Orna Bregman-Amitai, 6 Vollman Street, Tel Aviv (IL); Shlomo Polonsky, 66 Emek HaHula Street, Apt. 6, 717Modi'in (IL)

( * ) Notice: Subject to any disclaimer, the term of this patent is extended or adjusted under 35 U.S.C. 154(b) by 250 days.

(21) Appl. No.: 09/589,006

(22) Filed: Jun. 7, 2000

(30) Foreign Application Priority Data

Jun. 7, 1999 (IL) .................................................. 130337

(51) Int. Cl.⁷ .............................................. G06T 15/20
(52) U.S. Cl. ....................... 345/427; 345/629; 345/630; 345/638
(58) Field of Search ................................. 345/427, 629, 345/630, 632, 635, 636, 637, 638

(56) References Cited

U.S. PATENT DOCUMENTS 5,704,837 A * 1/1998 Iwasaki et al. ............... 463/2
5,930,740 A * 7/1999 Mathisen ..................... 702/152

* cited by examiner

*Primary Examiner*—Mark Zimmerman
*Assistant Examiner*—Kimbinh T. Nguyen

(57) ABSTRACT

A method for realistically implanting a non-floating. Computer Graphic Image object into a real camera image sequence filmed scene, and for obtaining roaming capabilities therein, including modeling a picture into which a Computer Graphic Image object is to be implanted by creating therefor imaginary borders, providing a three-dimensional vector representing the movement of the camera between each frame, and expanding said vector to a plane by calculating the movement of the camera while marinating its original angles; and therewith by respectively using an imaginary camera to render a 3D object on a screen of a computer and by respectively coordinating the filming camera's angle with the imaginary camera for implanting the Computer Graphic Image object in the image sequence filmed scene; wherein the method is characterized by implementing angular noise from the filming camera's angle to the object rendered by the imaginary camera.

16 Claims, 4 Drawing Sheets

(3 of 4 Drawing Sheet(s) Filed in Color)

METHOD FOR ACHIEVING ROAMING CAPABILITIES AND PERFORMING INTERACTIVE CGI IMPLANTING, AND COMPUTER GAMES USING SAME

FIELD OF THE INVENTION

The present invention relates to a method for achieving roaming capabilities, and for performing interactive CGI implanting, into video footage. The invention further relates to interactive computer games made by the method.

BACKGROUND OF THE INVENTION

"First person" real-life simulation games, where the player enacts the role of the hero while viewing the world through his eyes, are very widespread. Some types of such games include car racing, skiing, catch-the-bad-guy or dodge-the-bullets, etc. These games are almost uniquely CGI based, since video lacks the interactive ability needed for a player to participate in such a game. A filmed "first-person" action scene, such as a car race filmed through the windshield of a participating car, lacks the ability to enable a player to change what he is seeing in real time (i.e. move to the sides, slow down or speed up, adding of other cars on the track etc.), thus eliminating the possibility of using such a scene for these purposes (or for any other purpose needing interactive capabilities).

Although the art has dealt with many aspects of image processing and computer games, and has addressed various problems connected with the insertion of computer generated images (CGI) into real images, it has so far failed to provide simple and efficient methods by which it is possible to implant CGI into video footage, and to achieve interactive roaming capabilities.

By "roaming capability" it is meant to indicate the ability to simulate a movement of the camera inside the frame, by changing the viewer's point of view (angle and location).

It is therefore an object of this invention to provide a method for adding interactive capabilities to filmed video footage depicting a scene.

It is a further object of the invention to provide a method for implanting CGI objects into the world depicted in a picture, which is a part of a real-life scene.

It is still another object of the invention to provide means for simulating camera movements inside a filmed frame, and to obtain new points-of-view that were not originally filmed, using a single point-of-view.

It is still another purpose of this invention to provide computer games which utilize the method of the invention and which provide CGI interactive operation, and roaming capabilities.

Other purposes and advantages of this invention will appear as the description proceeds.

SUMMARY OF THE INVENTION

The invention is directed to a method for implanting a CGI object into a real image sequence, and for obtaining roaming capability therein, including modeling the picture into which the CGI object is to be implanted by creating therefor imaginary borders consisting of perpendicular planes and a floor, providing a three-dimensional vector representing the movement of the camera between each frame, and expanding said vector to a plane by calculating the movement of the camera to the left and to the right of the original location while maintaining its original angles.

According to a preferred embodiment of the invention, in order to achieve CGI implantation coinciding with the surface on which the camera moves, the floor is included of a plurality of planes essentially coinciding with the slope and direction of the surface on which the camera moved when filming the frames.

According to another preferred embodiment of the invention in order to achieve roaming capabilities, for each frame a single plateau is provided as the floor. In one preferred embodiment of the invention the single plateau is the plane which approximates best the real average surface. According to another preferred embodiment of the invention the single plateau is the expansion of the plateau nearest to the camera forward towards infinity.

The invention also encompasses a computer game including CGI implantation, and roaming capabilities, whenever prepared by the method of the invention.

Furthermore, it should be understood as substantially equivalent that the present invention relates to an article of manufacture including a computer usable medium having computer readable program code embodied therein for implanting a CGI object into a real image sequence, and for obtaining roaming capability therein, the computer readable program code in said article of manufacture including: first computer readable program code for causing a computer to model the picture into which the CGI object is to be implanted by creating therefor imaginary borders consisting of perpendicular planes and a floor; tied to the first computer readable program code, second computer readable program code for causing the computer to provide a three-dimensional vector representing the movement of the camera between each frame; and tied to the second computer readable program code, third computer readable program code for causing the computer expand said vector to a plane by calculating the movement of the camera to the left and to the right of the original location while maintaining its original angles.

Likewise, it should be acknowledged that the present invention relates to a program storage device readable by machine, tangibly embodying a program of instructions executable by the machine to perform method steps for implanting a CGI object into a real image sequence, and for obtaining roaming capability therein, said method steps including: modeling the picture into which the CGI object is to be implanted by creating therefor imaginary borders consisting of perpendicular planes and a floor, providing a three-dimensional vector representing the movement of the camera between each frame, and expanding said vector to a plane by calculating the movement of the camera to the left and to the right of the original location while maintaining its original angles.

In addition, it should be recognized that the present invention relates to an article of manufacture including a computer usable medium having computer readable program code embodied therein for a computer game for implanting a CGI object into a real image sequence, and for obtaining roaming capability therein, the computer readable program code in said article of manufacture including: first computer readable program code for causing a computer to model the picture into which the CGI object is to be implanted by creating therefor imaginary borders consisting of perpendicular planes and a floor; tied to the first computer readable program code, second computer readable program code for causing the computer to provide a three-dimensional vector representing the movement of the camera between each frame; and tied to the second computer readable program code, third computer readable program code for causing the computer expand said vector to a plane by calculating the movement of the camera to the left and to the right of the original location while maintaining its original angles.

It should also be appreciated that the present invention relates to a program storage device readable by machine, tangibly embodying a program of instructions executable by the machine to perform method steps for a computer game for implanting a CGI object into a real image sequence, and for obtaining roaming capability therein, said method steps including: modeling the picture into which the CGI object is to be implanted by creating therefor imaginary borders consisting of perpendicular planes and a floor, providing a three-dimensional vector representing the movement of the camera between each frame, and expanding said vector to a plane by calculating the movement of the camera to the left and to the right of the original location while maintaining its original angles.

BRIEF DESCRIPTION OF THE DRAWINGS

FIG. 3 illustrates the semi-automatic data acquisition process. The user (the person generating the game) divides the screen into the room polygons in frame 1. He then moves forward until he finds the next frame he should use as a key frame (in this case, frame 20). The computer then calculates the movement of each of the polygon nodes and linearly interpolates the polygons for all the frames in between;

DETAILED DESCRIPTION OF PREFERRED EMBODIMENTS

The method of the invention requires generating a picture that appears to the onlooker to be real although, it may not be an imitation of real life. Therefore, it is only partly necessary to. connect the real world to the filmed video. In order to move around in the picture and implant objects it is needed to obtain a model of the world depicted in the picture, but this world need be only as accurate as needed to obtain good visual results. More so, there are instances in which such an inaccurate model obtains better visual results than an accurate one. This is due to the fact that the human eye is more sensitive to some compromises than others, and automated mathematical computations done in an effort to create an exact model do not take this fact into account.

Figure 1:
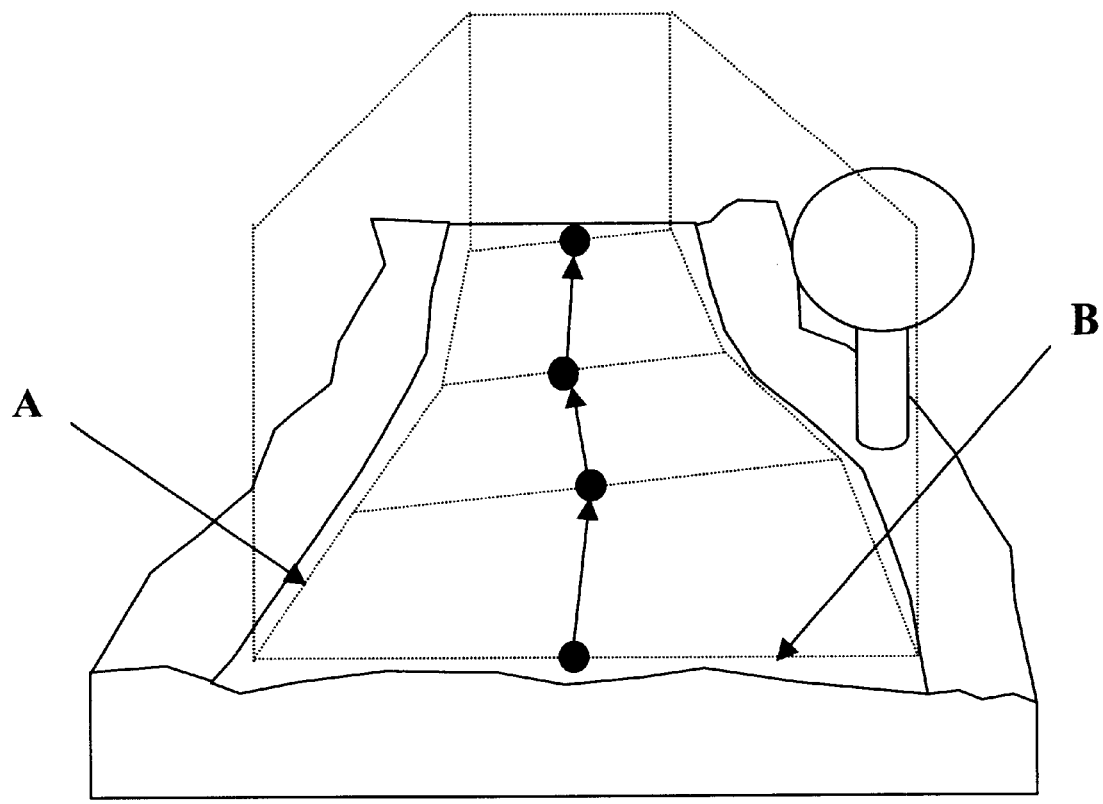
FIG. 1 is a cross-section of a road. Each point represents a video frame (i.e. the position of the camera when the frame was filmed). A 3D vector between each frame represents the movement of the camera between each frame. The model is built by expanding each such vector to a plane by calculating the movement of the camera to the left and to the right of the original location while maintaining its original angles.

According to the invention, a virtual world is created by modeling the real world using the following approximations:

1) The virtual world consists of a surface on which the camera moves bordered by a few perpendicular planes that represent the rest of the scenery in the world. In other words, the camera is moving on a floor inside a room with flat walls onto which the scenery to the sides of the surface is projected. The floor is the only part of the room that represents the real world in some way. The surface on which the camera moves (the floor) is included of a series of planes that represent the real world only in one dimension—the one coinciding with the direction of the camera's movement. The other dimension of each plane is only an expansion of the camera's movement vector for that frame to a plane, done by keeping the camera angles constant and calculating a lateral movement to the left and to the right. This is illustrated in FIG. 1. In the figure, the expansion of vector in the dimension of arrow "A" represents the topography's slope in its direction, while the expansion of vector in the dimension of arrow "B" does not represent the topography and is achieved by simulation of lateral camera movement.

Figure 2:
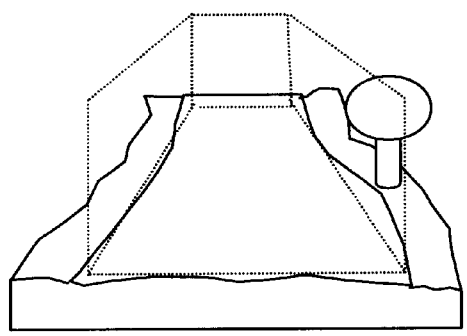
FIG. 2 is an illustration of a model, for achieving roaming capabilities, even further simplified by setting the floor to be one plane only, an expansion to infinity of the one closest to the frame in, or by finding the average plane of this frame.

2) In order to implant a CGI object use is made of the model described above. For the purpose of achieving the roaming capabilities, the model is even further simplified: for each frame it is assumed that the floor is included only of the one plateau, which is the expansion of the plateau nearest to it forward towards infinity. This is illustrated in FIG. 2.

The following data are needed in order to create the model of the invention:

1. The length of the 3D vector between each frame (the distance the camera moved);
2. The direction of the said vector; and
3. The width of the "floor" in each frame.

The distance moved between each frame (the length of the vector) is obtained during the filming of the sequence. According to a preferred embodiment of the invention, when filming the scene with a vehicle, the vehicle tachometer is connected to the camera's microphone. A tachometer outputs an induced single frequency that grows in a linear manner as the speed of the vehicle grows. Once the number of cycles coinciding with a known covered distance is obtained, it is easy to deduce what distance was passed between two frames by counting the number of cycles in each frame. A simple algorithm that counts zero-crossings is used for this, which is not described herein in detail, for the sake of brevity, since it is apparent to the skilled person.

If the scene was not filmed from a vehicle that utilizes a tachometer, some other means of measurement must be used (such as an inertial Global Positioning System (GPS) or similar navigational devices).

The direction moved between each frame (the direction of the vector) must also be established. According to a preferred embodiment of the invention the direction of each vector, i.e. the 3D angle, is calculated offline using the video flow in the picture. This is a partially automated procedure done on groups of frames. For instance, a group can be made up of 50 frames, but this number may vary depending on the speed of the filming camera, and can be derived by the user by trial and error once the process is understood. According to this preferred embodiment of the invention, the user chooses an area in the first frame of a group that is close to infinity. This area is used as a reference for the rest of the frames in the current group. The assumption is that such an area is far enough away so as not to change in each of the group's frames in comparison to the first frame. In essence, this area is used as a gyro: any roll, pitch or yaw angle detected in a frame by comparing the area in the said frame to the one in the first frame, is actually the angle of the whole camera in that frame.

The angle computation is done by computing the flow of the video in the selected area between the first frame of the group and each of the following ones. Thus an angle matrix for each frame in the group compared to the first frame is obtained. When done, all groups are connected through their first and last frames.

The process can be effected using, e.g., the algorithm described below:

User Input
- A Polygon enclosing a selected object close to infinity in one image of the processed sequence.
- The first and the last frames of the sequence.
- The focal length of the camera (relative to image width).
- Optical flow processing parameters: Number of solver iterations, Tolerance, Smooth filter size, Gradient filter size, Additional optimization of final result by simplex method (yes or no), Components of motion to be calculated/stabilized (tilt, pan, roll).

The Calculation

The algorithm calculates rotation parameters (pan, tilt and roll) that register the specified polygon from a chosen reference frame to the compared frame.

The basic equation is the optical flow equation:

$$u(x,y,t)Ix(x,y,t)+v(x,y,t)Iy(x,y,t)+It(x,y,t)=0 \quad (1)$$

Where u, v are the x and, y components of the displacement of pixel (x, y) between the frames t and t+dt; Ix and Iy are x and y partial derivatives of image intensity I(x, y, t); and It is time-derivative of image intensity.

The algorithm minimizes the error function at frame t in the selected polygon R:

$$Err\ (u,\ v)=SumR(u*Ix+v*Iy+It)^2 \quad (2)$$

The calculation is performed iteratively. In each calculation step, the best rotation parameters that minimize error function (2) are calculated by Memory Request (MRQ) method. Then, the register image is warped according to the calculated rotation, and the procedure is repeated until the difference between the reference image and warped image is smaller than the tolerance. If needed, the final result is refined by minimization of direct difference of image intensities by a multidimensional simplex minimization method.

The Output

The results of the calculations described above are camera rotation matrices for each processed frame compared to a single reference frame of the footage (a chosen reference frame from one group).

Once the camera angles are computed they are employed as explained below. It is not essential to compute them in the specific way explained above. Other methods using the video flow exist (although the above method was found to be the most accurate). One such other method is the 8-point algorithm, which does not impose the infinity restriction on the chosen reference areas, but has its own limitations. 8-point algorithm is disclosed, for example, in "A computer algorithm for reconstruction of a scene from two projections," H. C. Longuet-Higgins, Nature, Vol. 293, pp. 133–135, September 1981.

The Width of the "Floor" in Each Frame

Figure 3:
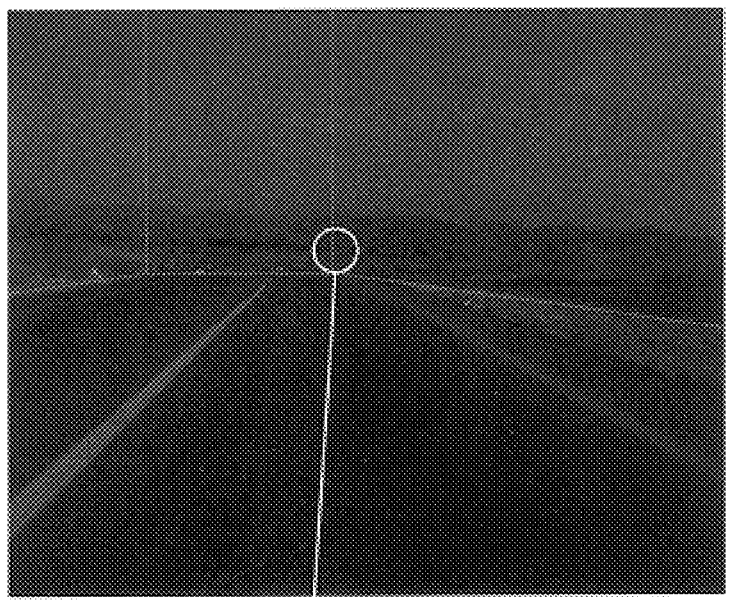
Figure 3:
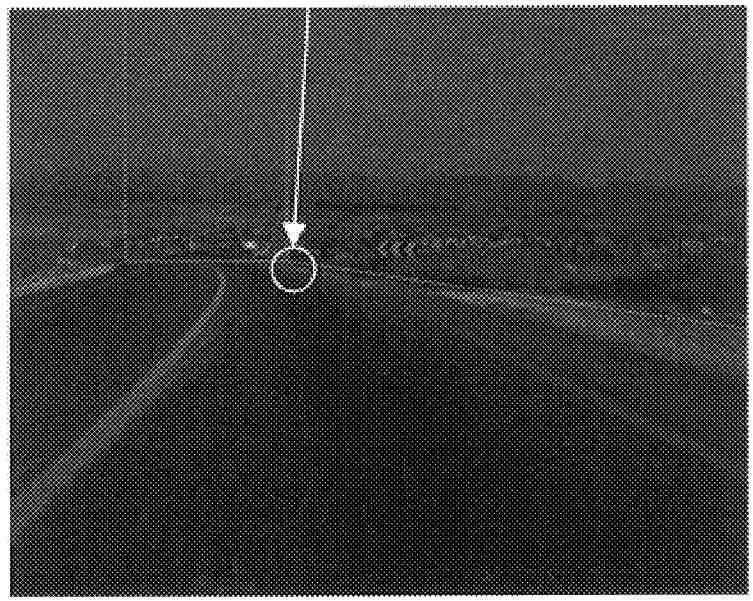

The width of the floor in each frame is also obtained through a semi-automatic procedure. As explained above, the scenery to the sides of the surface on which the camera is moving is treated as being screened onto a wall, and the surface itself is a set of plateaus. For roaming, this means that each frame is divided into a number of polygons, one of them being a plateau representing the floor, and the other being the walls. This division is different for each frame, as the scenery changes. It is very important to the quality of the final results that the division is chosen so as to achieve maximal visual results and minimal discrepancies felt by the human eye. This is where the intervention of the user adds to quality: working on key frames, he manually marks the polygons on these frames. The computer then does a linear interpolation of this division and divides the rest of the frames between these key frames. This is illustrated in FIG. 3 . . . F1 is Frame No. 1, and F20 is Frame No. 20. The user divides the screen into the room polygons in Frame 1. He then moves forward until he finds the next frame to be used as a key frame (in the example of FIG. 3, F20). The computer then calculates the movement of each of the polygon nodes and linearly interpolates the polygons for all the frames in between. A node is indicated by a circle in both pictures, connected with the arrow going from F1 to F20.

The CGI object must now be implanted. Having obtained the length of the camera movement for each frame and its rotation matrix (i.e. its direction), we can now perform a simple integration (adding) of the vectors and obtain the relative position of the camera in each frame compared to the first frame (or any other relative frame). Since the camera is attached firmly to the moving vehicle, this position minus the camera height is the topographical representation of the surface, as explained before. Having done this it is now possible to implant a CGI object.

The most important aspect of implanting a CGI object in a filmed scene is coordinating the filming camera's angle with an imaginary "camera" used to render a 3D object on a screen of the computer. If this is not done accurately enough, the result is an object that seems to "float" on the screen and is not connected to the filmed scene. For example, a camera that is placed on a car and used to film the road while the car is driving has certain angular "noise" due to the uneven topography of the road and the car vibrations. If this noise is not implemented into the computer "camera" rendering a CGI model of a car onto this road, the rendered car will not be able to be fixed to a specific point on the road. The film will have random angular movement due to the noise but the car will stay static. This will cause the car to look as if it were floating on the road, rather than driving on it.

Also, the object needs to recognize the 3D world depicted in the 2D picture it is implanted in.

Figure 4:
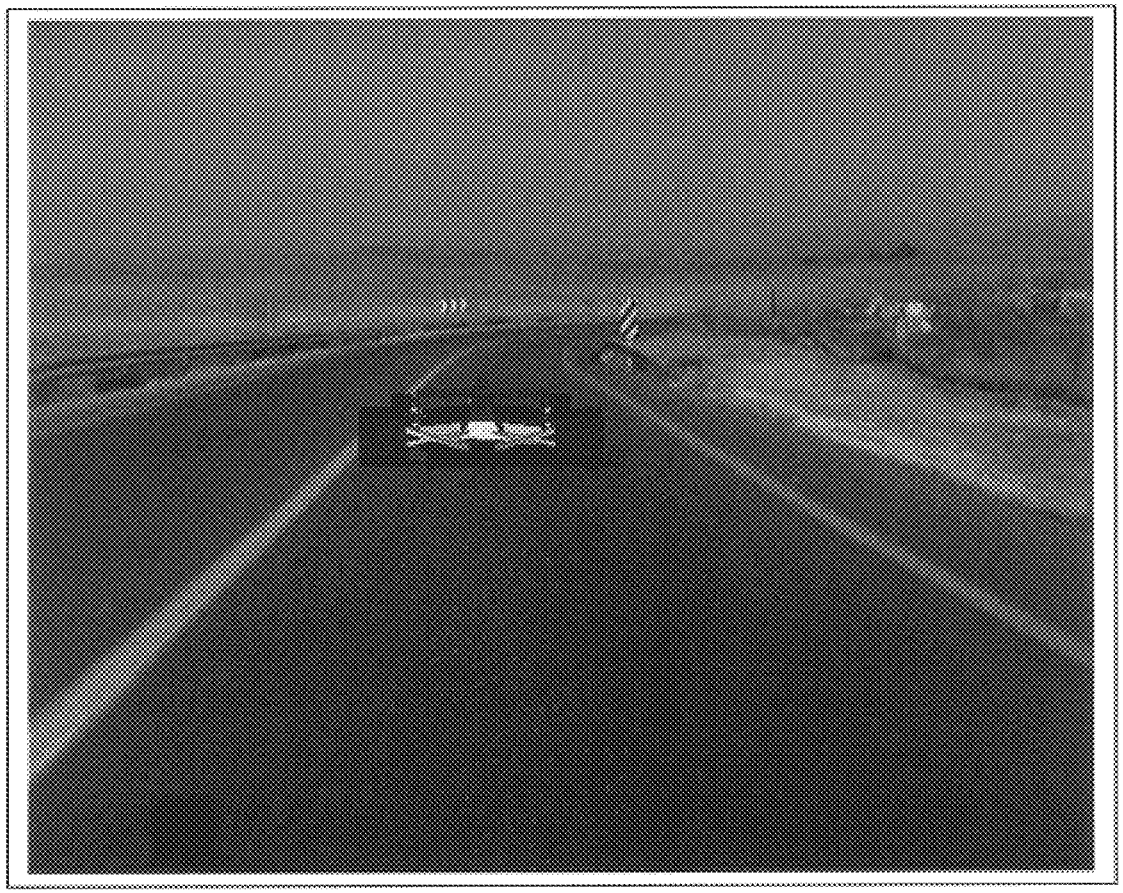
FIG. 4 illustrates the implantation of a CGI car on a filmed road. The computer camera position coincides exactly with the real camera position. The car position is actually the camera position a few frames ahead. The combination of the two gives an exact implanting.
Figure 5A:
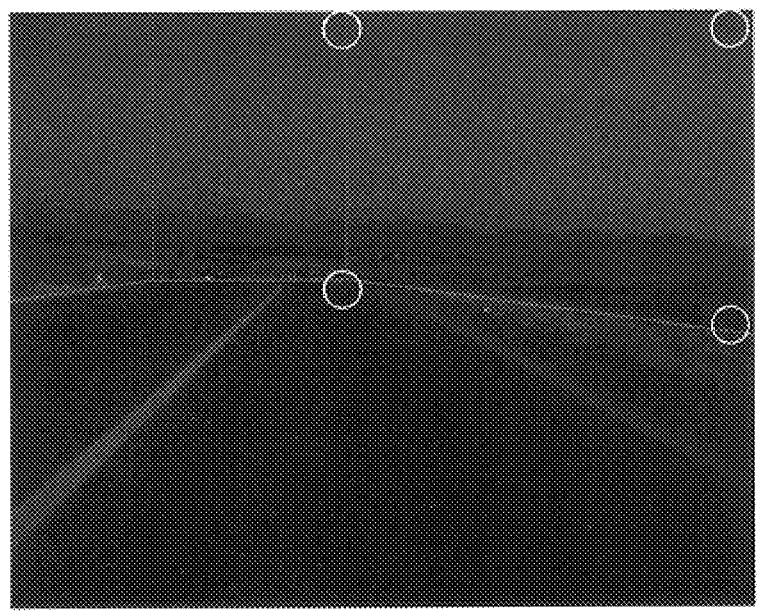
FIG. 5 illustrates the roaming procedure. The upper frame is the original one and the lower one depicts a roaming action to the right. The movement of the floor polygon is computed as explained. The floor and wall polygon movements are computed as explained: first, by calculating the real 3D coordinates of the wall, the planes they represent are obtained. Next formula (3) described below (R+(tn)T/d) is applied to each plane to obtain the matrix to be applied to the polygon representing said plane.
Figure 5B:
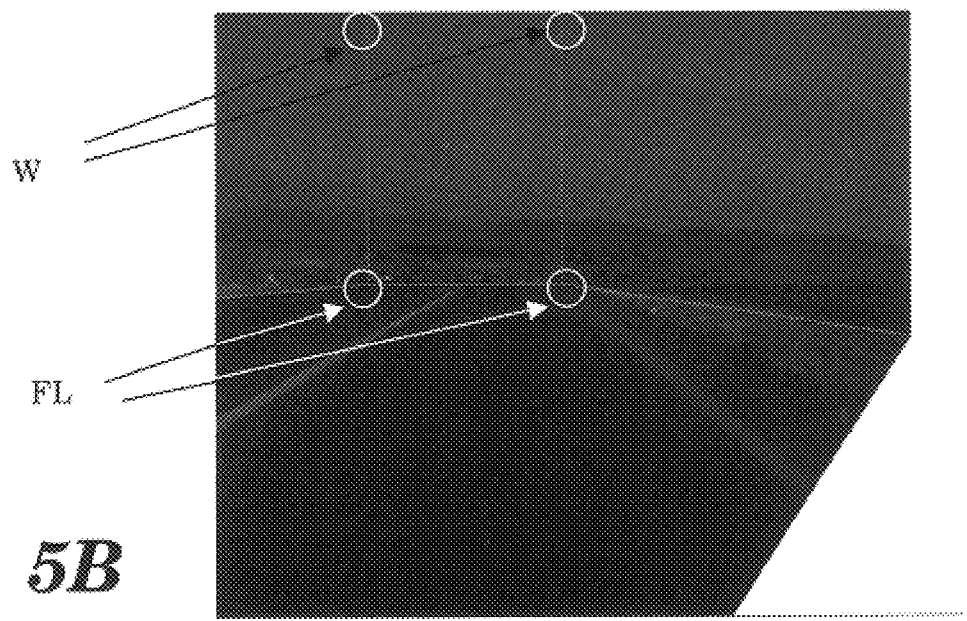

Using the integrated data both goals can be achieved, as follows:

For each frame, the computer camera rendering the 3D CGI object is fed with the current frame's real camera position. This assures that any movement in the film will automatically be joined by a movement of the CGI object, thus placing him exactly where needed. The result is shown in FIG. 4, in which it can be seen that the CGI car implanted on the filmed road appears quite naturally located.

In order to implant an object in front of us, we have only to load the computer object position matrix with the camera position coinciding with the needed location. For example, if we are viewing frame j of a filmed road and wish to implant a car x meters in front of us, we have only to find what frame j+n coincides with that distance and use its camera position matrix as that car's position. If the desired distance falls between two frame locations, all that is required is to perform a simple linear interpolation between them.

The roaming effect is now generated, as follows. Having divided each frame into a room, we can now simulate camera movement in the real world depicted in the picture, by moving the camera in the room itself. An illusion sufficient for giving a feeling of real life movement is achieved. The "floor" moves in a way close to a real life movement. The equation for a plane viewed from a point of view located (R, t) away from a current point (where R is the rotation done when moving from one point to the other and t being the translation) is:

$$R+(tn^T)/d \tag{3}$$

where n is the normal of the plane and d its distance in the normal coordinate system. The normal of each plane is calculated as follows: First, the 3D coordinates of each of the floor nodes is calculated by projecting each 2D node of the floor polygon (on the screen) onto the known 3D plane of the floor (obtained as explained above). Subtracting one of these points from another, and the other from yet another point, two 3D vectors are obtained describing the borders of the floor plane. Performing a cross product on them gives the desired normal. The distance is obtained by multiplying one of the used points by this normal.

The wall normals are obtained by taking the two points of each wall that are common with the floor and a third point that is directly above one of these points (for instance, adding 1 to the y of one point), and performing the same computations as done to the floor and as described above.

The rotation in the formula is the change in the camera's angle that it is wished to obtain (roll, tilt and pan) and the translation is the change in the camera position that it is desired to obtain (viz., up/down, left/right, and forward/ backward with respect to the current position).

Applying each computed matrix to its relevant polygon (floor or wall) will achieve the required effect while keeping all boundary conditions automatically intact.

It is important to understand that the simplified model of the preferred embodiment of the invention described in the example above, is adequate in topographical respects, since no data are needed on the topography of the surface to the sides of the camera. For example, if a video is filmed while driving in the middle of a road, we have only the topographical representation of the line we drove one since the film represents only this specific part of the road. No matter what "tricks". we do to simulate camera movement to any side, we are still actually seeing the middle of the road (though we do not feel it) and therefor a bump in the road to the side of the camera is never felt on the film. If it is desired to simulate specific surface changes (for example: a slope to the side, gravel or pit hole in the road etc.) this can be done through an artificial movement of the film being seen.

In describing the present invention, explanations have been presented in light of currently accepted scientific technological or psychophysical theories (and models). Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations hereinabove, relate to these embodiments, and are presented for the purpose of teaching, the current man of the art or the current team of the art, how these embodiments may be substantially realized in practice. Alternative or equivalent explanations for these embodiments may neither deny nor alter their realization.

More specifically, while embodiments of the invention have been described by way of illustration and by way of non-limiting examples, it will be understood that the invention can be carried out by persons skilled in the art with many modifications, variations and adaptations, without departing from its spirit or exceeding the scope of the claims.

What is claimed is:

1. A method for realistically implanting a non-floating Computer Graphic Image object into a real camera image sequence filmed scene, and for obtaining roaming capabilities therein, including: in a first frame of a group of frames of the image sequence, using an area that is substantially close to infinity and therewith modeling a picture into which a Computer Graphic Image object is to be implanted by creating therefor imaginary borders consisting of perpendicular planes and a floor, providing a three-dimensional vector representing the movement of the camera between each frame, and expanding said vector to a plane by calculating the movement of the camera to the left and to the right of the original location while marinating its original angles; and therewith, by respectively using an imaginary camera to render a 3D object on a screen of a computer and by respectively coordinating the filming camera's angle with the imaginary camera for implanting the Computer Graphic Image object in the image sequence filmed scene; wherein the method is characterized by implementing angular noise from the filming camera's angle to the object rendered by the imaginary camera.

2. A method according to claim 1, wherein, to achieve Computer Graphic Image implantation coinciding with a surface on which the camera moves, the floor is included of a plurality of planes essentially coinciding with slope and direction of said surface on which the camera moves when filming the frames.

3. A method according to claim 1, wherein, to achieve roaming capabilities, for each frame a single plateau is provided as the floor.

4. A method according to claim 3, wherein the single plateau is the plane which approximates best the real average surface.

5. A method according to claim 3, wherein the single plateau is the expansion of the plateau nearest to the camera forward towards infinity.

6. A method according to claim 4, wherein the single plateau nearest to the camera forward towards infinity.

7. A computer game including CGI implantation, and roaming capabilities, whenever prepared by the method according to claim 1.

8. A computer game including CGI implantation, and roaming capabilities, whenever prepared by the method according to claim 2.

9. A computer game including CGI implantation, and roaming capabilities, whenever prepared by the method according to claim 3.

10. A computer game including CGI implantation, and roaming capabilities, whenever prepared by the method according to claim 4.

11. A computer game including CGI implantation, and roaming capabilities, whenever prepared by the method according to claim 5.

12. A computer game including CGI implantation, and roaming capabilities, whenever prepared by the method according to claim 6.

13. An article of manufacture including a computer usable medium having computer readable program code embodied therein for realistically implanting a non-floating Computer Graphic Image object into a real camera image sequence filmed scene, and for obtaining roaming capability therein, the computer readable program code in said article of manufacture including:

(a) first computer readable program code for causing a computer to, in a first frame of a group of frames of the image sequence, use an area that is substantially close to infinity and therewith to model the picture into which the Computer Graphic Image object is to be implanted by creating therefor imaginary borders consisting of perpendicular planes and a floor;

(b) tied to the first computer readable program codes second computer readable program code for causing the computer to provide a three-dimensional vector representing the movement of the camera between each frame; and (c) tied to the second computer readable program code, third computer readable program code for causing the computer expand said vector to a plane by calculating the movement of the camera to the left and to the right of the original location while maintaining its original angles; and therewith, to respectively use an imaginary camera to render a 3D object on a screen of a computer and to respectively coordinate the filming camera's angle with the imaginary camera for implanting the Computer Graphic Image object in the image sequence filmed scene; wherein the method is characterized by implementing angular noise from the filming camera's angle to the object rendered by the imaginary camera.

14. A program storage device readable by machine, tangibly embodying a program of instruction executable by the machine to perform method steps for implanting a CGI object into a real image sequence, and for obtaining roaming capability therein, said method steps including: modeling the picture into which the CGI object is to be implanted by creating therefor imaginary borders cosisting of perpendicular planes and a floor, providing a three-dimensional vector representing the movement of the camera between each frame, and expanding said vector to a plane by calculating the movement of the camera to the left and to the right of the original location while maintaining its original angles.

15. An article of manufacture including a computer usable medium having computer readable program code embodied therein for a computer game for realistically implanting a non-floating Computer Graphic Image object into a real camera image sequence filmed scene, and for obtaining roaming capability therein, the computer readable program code in said article of manufacture including:

(a) first computer readable program code for causing a computer to, in a first frame of a group of frames of the image sequence, use an area that is substantially close to infinity and therewith to model the picture into which the Computer Graphic Image object is to be implanted by creating therefor imaginary borders consisting of perpendicular planes and a floor;

(b) tied to the first computer readable program code, second computer readable program code for causing the computer to provide a three-dimensional vector representing the movement of the camera between each frame; and (c) tied to the second computer readable program code, third computer readable program code for causing the computer expand said vector to a plane by calculating the movement of the camera to the left and to the right of the original location while maintaining its original angles; and therewith, by respectively using an imaginary camera to render a 3D object on a screen of a computer and by respectively coordinating the filming camera's angle with the imaginary camera for implanting the Computer Graphic Image object in the image sequence filmed scene; wherein the method is characterized by implementing angular noise from the filming camera's angle to the object rendered by the imaginary camera.

16. A program storage device readable by machine, tangibly embodying a program of instructions executable by the machine to perform method steps for a computer game for implanting a CGI object into a real image sequence, and for obtaining roaming capability therein, said method steps including: modeling the picture into which the CGI object is to be implanted by creating therefor imaginary borders consisting of perpendicular planes and a floor, providing a three-dimensional vector representing the movement of the camera between each frame, and expanding said vector to a plane by calculating the movement of the camera to the left and to the right of the original location while maintaining its original angles.

* * * * *